United States Patent
Tomita et al.

(10) Patent No.: US 11,867,717 B2
(45) Date of Patent: Jan. 9, 2024

(54) ROTATION SPEED SENSOR

(71) Applicant: Proterial, Ltd., Tokyo (JP)

(72) Inventors: Kazuhiko Tomita, Tokyo (JP); Kento Okuyama, Tokyo (JP); Kei Kawano, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 302 days.

(21) Appl. No.: 17/011,309

(22) Filed: Sep. 3, 2020

(65) Prior Publication Data

US 2021/0080480 A1 Mar. 18, 2021

(30) Foreign Application Priority Data

Sep. 13, 2019 (JP) ................................. 2019-167206

(51) Int. Cl.
*G01P 3/487* (2006.01)
*G01D 5/12* (2006.01)

(52) U.S. Cl.
CPC ................ *G01P 3/487* (2013.01); *G01D 5/12* (2013.01)

(58) Field of Classification Search
None
See application file for complete search history.

(56) References Cited

U.S. PATENT DOCUMENTS

| 2009/0243595 A1* | 10/2009 | Theuss .............. B29C 45/14639 324/207.11 |
| 2012/0319682 A1* | 12/2012 | Ausserlechner ..... G01R 33/072 257/E27.005 |
| 2017/0153265 A1 | 6/2017 | Yamamoto et al. |

FOREIGN PATENT DOCUMENTS

| JP | H03-91969 U | 9/1991 |
| JP | 2017096828 A | 6/2017 |

OTHER PUBLICATIONS

Notification of Reasons for Rejection corresponding to Japanese Patent Application No. 2019-167206, dated October 11, 20212 and its English translation.

* cited by examiner

*Primary Examiner* — Paul M. West
*Assistant Examiner* — Mark A Shabman
(74) *Attorney, Agent, or Firm* — McCormick, Paulding & Huber, PLLC

(57) ABSTRACT

An air gap of a rotation speed sensor is increased. A rotation speed sensor according to one embodiment includes: a sensor component having magnetic sensing elements; and a magnetic plate that is arranged between the sensor component and a magnet and that is made of a magnetic material. In a first direction that is a direction in which the sensor component, the magnetic plate and the magnet are arranged, the magnetic plate includes an opening that is formed at a position overlapping center of a line connecting respective centers of the magnetic sensing elements.

8 Claims, 9 Drawing Sheets

ROTATION SPEED SENSOR

CROSS-REFERENCE TO RELATED APPLICATION

The present application claims priority from Japanese Patent Application No. 2019-167206 filed on Sep. 13, 2019, the content of which is hereby incorporated by reference into this application.

TECHNICAL FIELD OF THE INVENTION

The present invention relates to a rotation speed sensor utilizing a magnetic sensing element.

BACKGROUND OF THE INVENTION

A rotation speed sensor is mounted on, for example, a vehicle in order to sense a wheel rotation speed. The rotation speed sensor that is mounted on the vehicle for such a purpose is generally called a "wheel speed sensor". The rotation speed sensor functioning as the wheel speed sensor is mounted on the vehicle as one of components such as an antilock brake system (ABS system) that prevents wheel locking and a traction control system that prevents wheel slipping. A Patent Document 1 (Japanese Patent Application Laid-open Publication No. 2017-96828) describes a wheel speed sensor that senses a magnetic field change that is caused by rotation of a gear rotating together with the wheel.

SUMMARY OF THE INVENTION

A rotation speed sensor utilizing a magnetic sensing element senses a magnetic field caused by rotation of a gear, a pulser ring or others that is a workpiece to be measured, and outputs an electrical signal in accordance with a dimension of this magnetic field. In the case of the rotation speed sensor utilizing the magnetic sensing element, when a separate distance (referred to as air gap) between the workpiece to be measured and the rotation speed sensor becomes small, the magnetic field that is sensed by the magnetic sensing element of the rotation speed sensor becomes large. As a result, measurement accuracy of the rotation speed sensor can be improved.

However, a large air gap is preferable in consideration of easiness in attachment work of the rotation speed sensor, a degree of freedom of designing of the rotation speed sensor or others. Accordingly, a purpose of the present invention is to provide a rotation speed sensor capable of achieving the large air gap while maintaining the measurement accuracy.

A rotation speed sensor according to one embodiment includes: a sensor component having a first surface, a second surface on an opposite side of the first surface, a first magnetic sensing element arranged between the first surface and the second surface, and a second magnetic sensing element arranged between the first surface and the second surface so as to separate from the first magnetic sensing element; a magnet arranged in a region closer to the second surface of the sensor component; and a magnetic plate arranged between the second surface of the sensor component and the magnet and made of a magnetic material. The magnetic plate includes an opening formed in a first direction that is a direction in which the sensor component, the magnetic plate and the magnet are arranged.

For example, the opening is formed at a position overlapping center of a line that connects center of the first magnetic sensing element and center of the second magnetic sensing element in view of the first direction.

For example, the opening overlaps the first magnetic sensing element or the second magnetic sensing element in the view of the first direction.

For example, the opening overlaps both the first magnetic sensing element and the second magnetic sensing element in the view of the first direction.

For example, an opening end of the opening overlaps both the first magnetic sensing element and the second magnetic sensing element in the view of the first direction.

For example, a shape of the opening end of the opening of the magnetic plate is circular, and an opening diameter of the opening end of the opening is larger than a center-to-center distance between the first magnetic sensing element and the second magnetic sensing element.

For example, the first magnetic sensing element and the second magnetic sensing element are arranged along a second direction that is perpendicular to the first direction. The opening end of the opening of the magnetic plate includes a first opening diameter extending along the second direction and a second opening diameter extending along a third direction perpendicular to the first direction and the second direction. The second opening diameter is smaller than the first opening diameter and larger than the center-to-center distance between the first magnetic sensing element and the second magnetic sensing element.

For example, a virtual line that connects the centers of the first magnetic sensing element and the second magnetic sensing element overlaps center of the opening in the view of the first direction.

For example, the opening is a through hole that penetrates from one of the third surface and the fourth surface to the other.

According to a typical embodiment of the present invention, the air gap between the rotation speed sensor and the workpiece to be measured can be made large.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings.

<Entire Structure>

Figure 1:
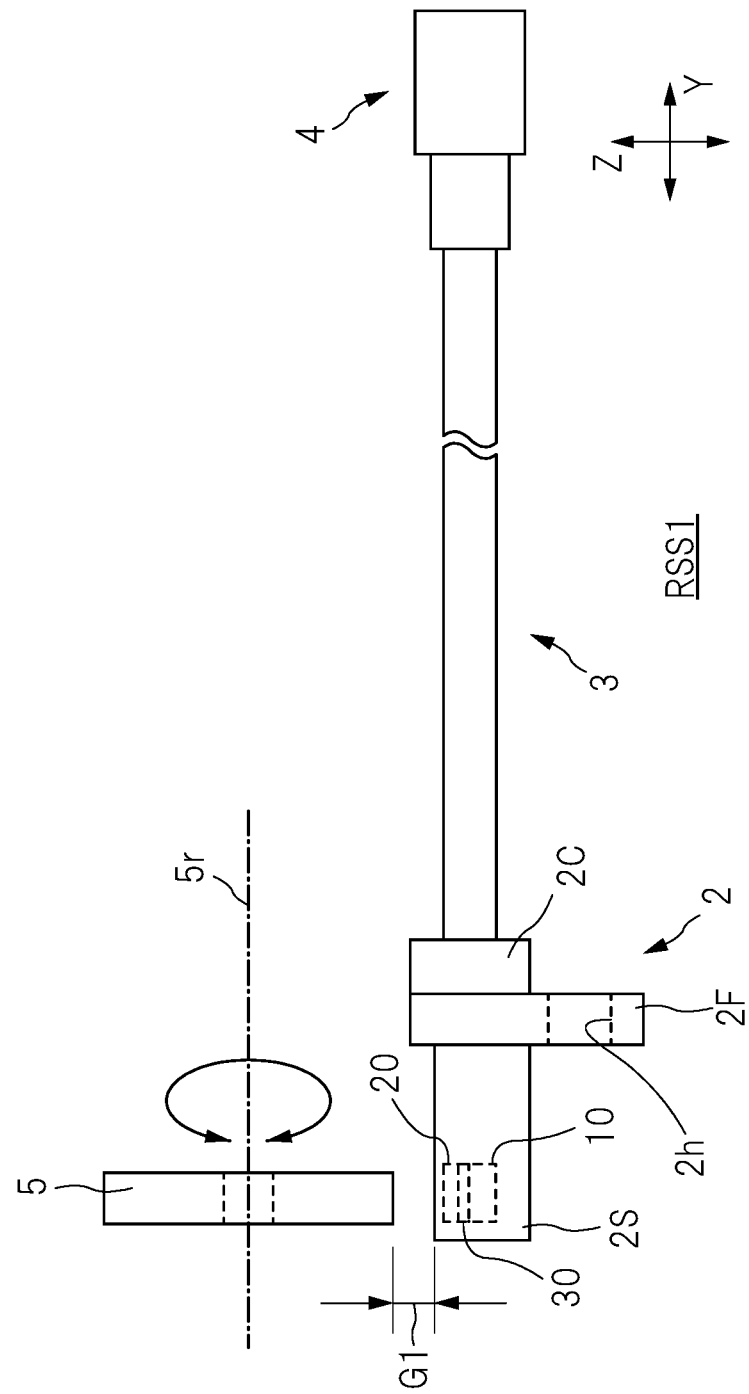
FIG. 1 is an explanatory diagram showing a configuration example of a rotation speed sensor according to one embodiment.

As shown in FIG. 1, a rotation speed sensor RSS1 according to the present embodiment includes a sensor head 2, a cable 3 and a connector 4. The sensor head 2 is arranged in vicinity of a gear 5 that rotates together with a wheel that is not illustrated. The sensor head 2 is fixed to a car body (a hub unit, a knuckle unit, a suspension unit and others) so that a positional relation between the sensor head and the gear 5 is a predetermined positional relation. In the present embodiment, the sensor head 2 is fixed so that a sensor holding portion 2S of the sensor head 2 and an outer circumference of the gear 5 (the outer circumference is a portion where a plurality of gear teeth 5T shown in FIG. 2 but described later are arranged) face each other. The gear 5 is made of a magnetic body, and rotates around a rotational axis 5r in accordance with rotation of the wheel not illustrated. A magnet 10 is embedded inside the sensor head 2. A direction (vector) and distribution of a magnetic field heading from the magnet 10 inside the sensor head 2 toward the gear 5 are changed by the rotation of the gear 5.

Inside the sensor head 2, a sensor component 20 that is a magnetic sensor IC outputting an electric signal depending on a dimension of the magnetic field is embedded. An "air gap G1" explained later is defined as the smallest distance between the rotation speed sensor RSS1 and the gear 5. In the present embodiment, a part of a housing of the sensor holding portion 2S is sandwiched between the gear 5 and the sensor component 20 embedded inside the sensor head 2, and therefore, the air gap G1 is defined as the smallest distance between the gear 5 and the housing of the sensor holding portion 2S. The sensor head 2 and the connector 4 are connected to each other through the cable 3. The electric signal that is output from the sensor component 20 embedded inside the sensor head 2 is transmitted to the connector 4 through the cable 3, and is input to a connecting destination of the connector 4. The connector 4 is connected to, for example, a control unit or a control device of the ABS system, a control unit or a control device that collectively controls various systems including the ABS system or others.

As shown in FIG. 1, the sensor head 2 includes a flange portion 2F, a sensor holding portion 2S that is arranged on one side of the flange portion 2F, and a cable holding portion 2C that is arranged on the other side of the flange portion 2F. The flange portion 2F, the sensor holding portion 2S and the cable holding portion 2C are made of a resin so as to be integrally molded. Each of the flange portion 2F, the sensor holding portion 2S and the cable holding portion 2C is a part of an injection-molded resin molded body.

The flange portion 2F includes a through hole 2h that penetrates from a side of the flange portion 2F closer to the sensor holding portion 2S toward a side of the same closer to the cable holding portion 2C. The through hole 2h is a bolt hole into which a bolt is inserted at the time of fixing of the sensor head 2.

<Surround Structure of Sensor Component>

Figure 2:
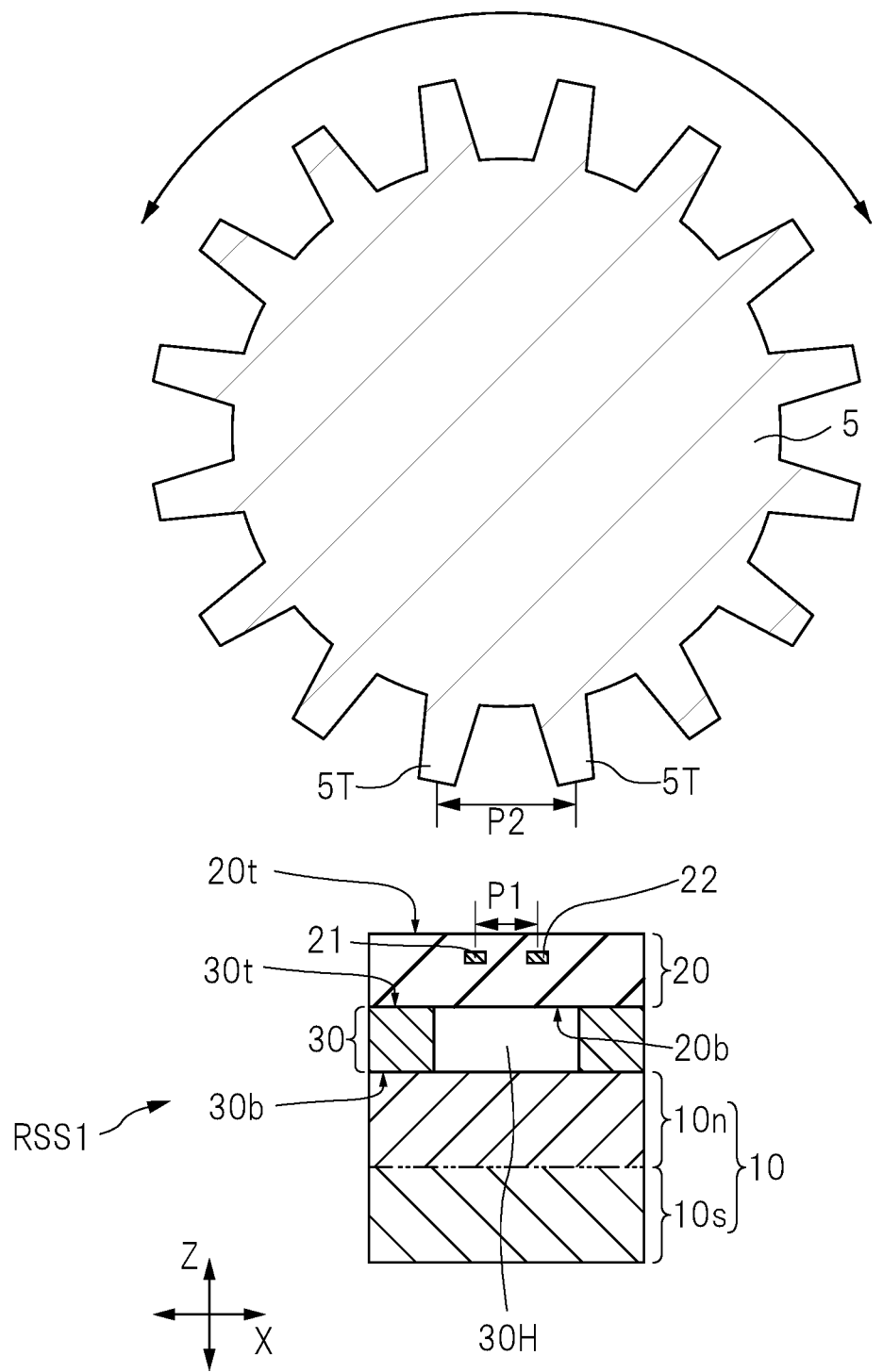
FIG. 2 is a cross-sectional view of an inner principal part of a sensor holding portion, the view being taken by cutting the sensor holding portion along a plane that is orthogonal to a rotational axis of a gear shown in FIG. 1.
Figure 3:
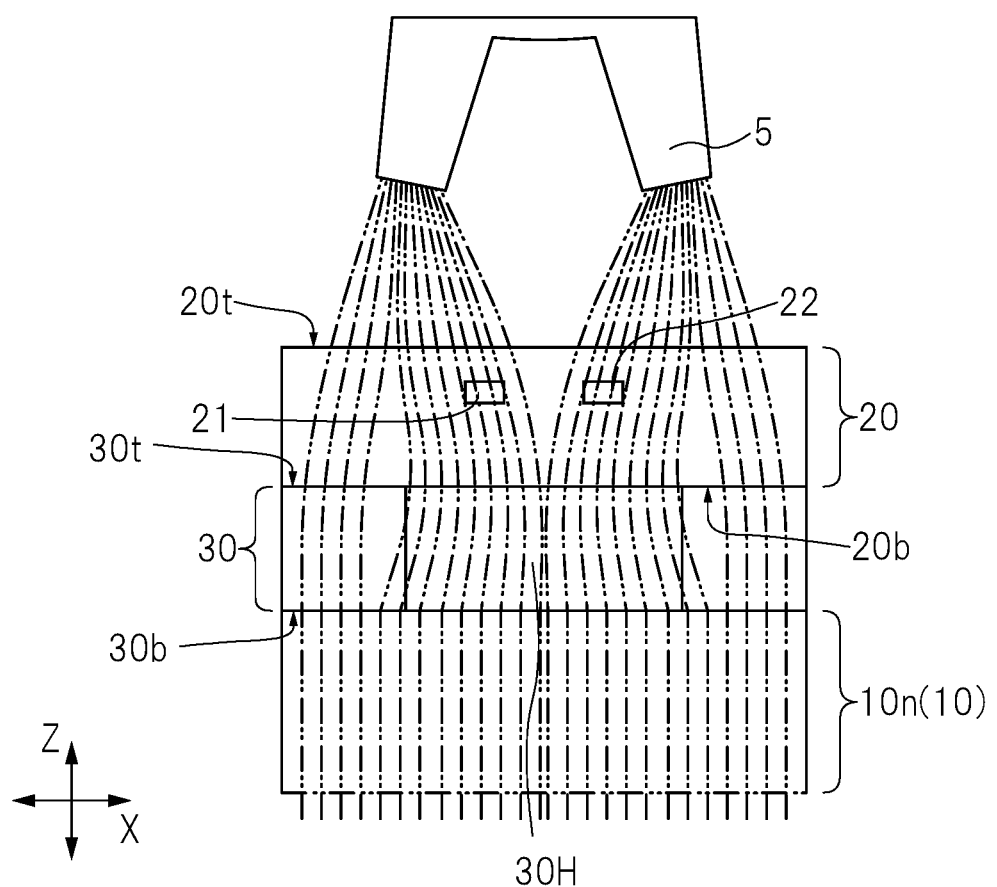
FIG. 3 is a cross-sectional view of a principal part schematically showing a magnetic flux line formed around the sensor component shown in FIG. 2.
Figure 4:
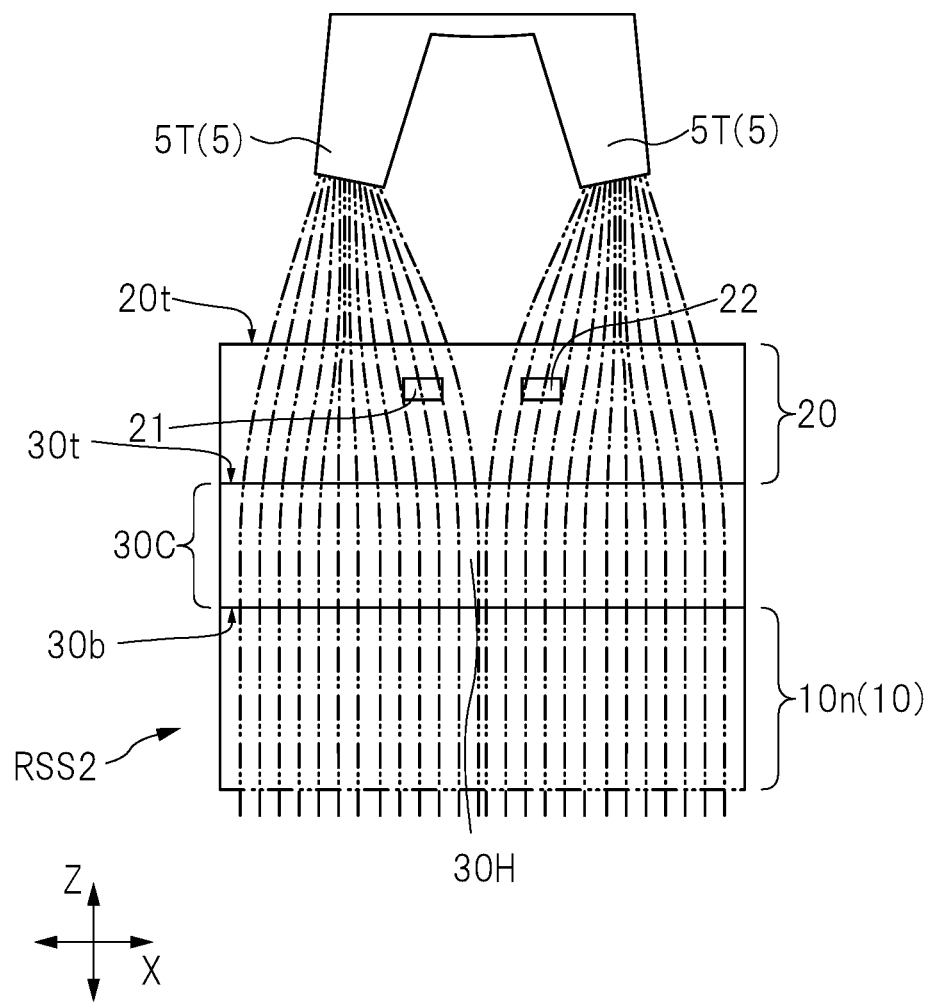
FIG. 4 is a cross-sectional view of a principal part showing a study example of the rotation speed sensor shown in FIG. 3.

Next, with reference to FIGS. 2 to 4, a surround structure of the sensor component 20 shown in FIG. 1 will be explained. The magnet 10, the sensor component 20 and the magnetic plate 30 shown in FIGS. 2 to 4 are fixed into the sensor holding portion 2S of the sensor head 2 (see FIG. 1). However, in FIGS. 2 to 4, illustration of the housing of the sensor head 2 made of the resin is omitted. In FIGS. 3 and 4, a conceptual drawing of the magnetic flux line that is formed around the sensor component 20 is shown with a dashed double-dotted line. Although FIGS. 3 and 4 are cross-sectional views, hatching of each member is omitted for easily viewing the direction of the magnetic field.

In the case of the rotation speed sensor RSS1 according to the present embodiment, the sensor component 20, the magnetic plate 30 and the magnet 10 are arranged inside the sensor holding portion 2S in this order from a region closer to the gear 5.

The sensor component 20 includes a top surface (first surface) 20t that faces the gear 5, a bottom surface (second surface) 20b on an opposite side of the top surface 20t, a magnetic sensing element (first magnetic sensing element) 21 that is arranged between the top surface 20t and the bottom surface 20b, and a magnetic sensing element (second magnetic sensing element) 22 that is arranged between the top surface 20t and the bottom surface 20b so as to separate from the magnetic sensing element 21. The magnet 10 includes a magnetic pole portion 10n that is magnetized to an N pole and a magnetic pole portion 10s that is magnetized to an S pole. In the present embodiment, the magnetic pole portion 10n faces the bottom surface 20b of the sensor component 20 while the magnetic pole portion 10s does not face the bottom surface 20b of the sensor component 20.

As each of the magnetic sensing elements 21 and 22, a hole element, a magnetic flux density of which is measured by utilizing hole effect, or a magneto resistive effect (MR) element measuring a dimension of magnetic field (magnetic flux or magnetic flux density) by utilizing magneto resistive effect can be used. Each of the magnetic sensing elements 21 and 22 according to the present embodiment is a giant magneto resistive effect (GMR) element. Each of the magnetic sensing elements 21 and 22 is arranged in an X direction (second direction) that is orthogonal to a Z direction (first direction) and a Y direction (see FIG. 1). The magnetic sensing elements 21 and 22 separate from each other, and a center-to-center distance P1 between them is smaller than a center-to-center distance P2 between edges of two adjacent gear teeth 5T of the plurality of gear teeth 5T of the gear 5.

In the case of the rotation speed sensor having the sensor component 20 that is arranged between the magnet 10 and the gear 5 as seen in the present embodiment, a magnetic force is applied from a back surface of the sensor component 20 (from the bottom surface 20b). Such a magnetic-force applying mode is referred to as back bias mode. As another example of the rotation speed sensor, a mode of arranging the magnet to a rotary body itself is cited. For example, the N pole and the S pole are alternately arranged on an outer circumference of a magnet encoder, and the sensor component is arranged at a position facing the magnet encoder. In this case, by rotation of the magnet encoder along with rotation of the wheel, a position of a magnetic pole of the magnet encoder is changed, and therefore, the magnetic field around the sensor component is changed.

The sensor component 20 including the magnetic sensing elements 21 and 22 senses a magnetic field in a horizontal direction (that is a direction taken along the X-Y plane including the X direction and the Y direction (see FIG. 1)). Each of the magnetic sensing elements 21 and 22 outputs the electric signal depending on a dimension of the sensed magnetic field. Therefore, by change in the magnetic field around each of the magnetic sensing elements 21 and 22, a value of a signal that is output from the magnetic sensing elements 21 and 22 is changed. The signal that is output from the magnetic sensing elements 21 and 22 is transmitted to, for example, a control unit or a control device of an ABS system, a control unit or a control device that collectively controls various systems including the ABS system or others through the cable 3 and the connector 4.

In the case of the back bias mode according to the present embodiment, a speed and a rotational direction of the rotary body are sensed by change in a degree of the penetration of the magnetic flux line extending from the magnet 10 toward the gear 5, the magnetic flux line penetrating the magnetic sensing elements 21 and 22 that are arranged between the magnet 10 and the gear 5. In this case, in order to improve sensing accuracy of the sensor component 20 for the magnetism, a small air gap G1 (see FIG. 1) tends to be formed. When the air gap G1, in other words, a clearance between the gear 5 and the sensor holding portion 2S is small, there is necessary to fix the sensor head 2 to a portion in vicinity of the gear 5. This case complicates a work for attaching a component to be fixed to the sensor head 2 itself or a portion near the sensor head 2. In consideration of a degree of freedom for designing of the sensor component 20, a large air gap G1 is preferable. For the air gap G1, a necessary value is set in consideration of variation in a size, an oscillation amplitude of oscillation, and others.

In a case of one magnet including the N pole and the S pole as seen in the magnet 10, a plurality of magnetic flux lines are formed around the magnet 10 so as to extend from the N pole to the S pole. As shown in FIG. 2, in the case of the rotation speed sensor RSS1, the magnetic plate 30 made of the magnetic material is arranged between the magnet 10 and the gear 5, more specifically between the magnet 10 and the sensor component 20. The magnetic plate 30 includes a top surface (third surface) 30t facing the bottom surface 20b of the sensor component 20 and a bottom surface (fourth surface) 30b positioned on an opposite side of the top surface 30t so as to face the magnet 10.

As the magnetic material making up the magnetic plate 30, a metal material is exemplified. In the case of the present embodiment, the magnetic plate 30 is made of a stainless steel (SUS430). When a magnetic body is arranged in vicinity of a permanent magnet, a magnetic flux line extending from an N pole of the permanent magnet extends toward the magnetic body, and penetrates the magnetic body. Therefore, in the case of the structure shown in FIG. 2, when the magnetic plate 30 is arranged between the sensor component 20 and the magnet 10, a magnetic flux density of a magnetic field extending from a magnetic polar portion 10n of the magnet 10 toward the sensor component 20 can be increased.

Here, a rotation speed sensor RSS2 according to a study example is shown in FIG. 4. A magnetic plate 30C of the rotation speed sensor RSS2 is a plate member. When this magnetic plate 30C is arranged between the magnet 10 and the sensor component 20, the magnetic field penetrating the magnetic plate 30C tends to linearly penetrate the magnetic plate 30C in a thickness direction of the magnetic plate 30C (the Z direction of FIG. 4). Strictly speaking, note that the direction (vector) of the magnetic field slightly changes even inside the magnetic plate 30C. However, the direction of the magnetic field in vicinity of center of the magnetic plate 30C is particularly difficult to change. Therefore, practically, the magnetic field can be regarded to linearly penetrate the magnetic plate 30C in the thickness direction. As shown in FIG. 4, even when the direction of the magnetic field is possibly changed by the rotation of the gear 5, this direction inside the magnetic plate 30C is apparently corrected to the Z direction by the magnetic plate 30C.

Therefore, when the magnetic plate 30C is sandwiched between the magnet 10 and the magnetic sensing elements 21, 22 of the sensor component 20, the large change in the direction of the magnetic field penetrating the magnetic sensing elements 21 and 22 is not caused even by the rotation of the gear 5 because of the correction effect of the magnetic plate 30C for the direction of the magnetic field.

When the separate distance between the magnetic plate 30C and the magnetic sensing elements 21, 22 is large, the magnetic field that is collected by the magnetic plate 30C tends to peripherally disperse, and, accordingly, the magnetic flux density of the magnetic field penetrating the magnetic sensing elements 21 and 22 is reduced. Therefore, in some cases, the air gap G1 (see FIG. 1) needs to be small in accordance with a demand level of the sensing accuracy.

In the case of the rotation speed sensor RSS1 according to the present embodiment, a degree of the correction of the magnetic field 30C for the direction of the magnetic field is reduced in vicinity of the magnetic sensing elements 21 and 22, so that the magnetic flux density of the magnetic field penetrating the magnetic sensing elements 21 and 22 can be increased. More specifically, as shown in FIG. 3, the magnetic plate 30 is not the simple plate member but has a shape with an opening 30H. The opening 30H is formed at a position overlapping center (center 25c in FIG. 6) of a line connecting center of the magnetic sensing element 21 and center of the magnetic sensing element 22 (a line 25 that is a virtual line shown with a dashed double-dotted line in FIG. 6) in a view case (view of the first direction) in the Z direction (first direction) that is the direction in which the sensor component 20, the magnetic plate 30 and the magnet 10 are arranged. In this manner, the direction of the magnetic field inside the opening 30H is difficult to be corrected, and therefore, a component of the magnetic field in the X direction crossing the Z direction is increased by the rotation of the gear 5. When the component of the magnetic field in the X direction is increased in vicinity of the magnetic sensing elements 21 and 22, the magnetic flux density of the magnetic field penetrating the magnetic sensing elements 21 and 22 can be increased. Note that the "overlapping position" described in the specification means that the center 25c is positioned inside a region where the opening 30H is formed in a planar view (view of the first direction) obtained when the X-Y plane is viewed in the Z direction (first direction).

Regarding the magnetic flux line shown with the dashed double-dotted line in FIG. 3, some of the plurality of magnetic flux lines conceptually extend from an inner side surface of the magnetic plate 30 toward the opening 30H. In this case, by adjustment of the positional relation between the opening 30H and the magnetic sensing elements 21, 22, the magnetic flux density in vicinity of the magnetic sensing elements 21 and 22 can be increased. As a result, even when the air gap G1 (see FIG. 1) is not small, the sensing accuracy can be improved. In other words, the large air gap G1 can be achieved while the necessary sensing accuracy is maintained.

A shape of the opening and a favorable positional relation between the opening 30H and the magnetic sensing elements 21, 22 will be sequentially explained below.

Figure 5:
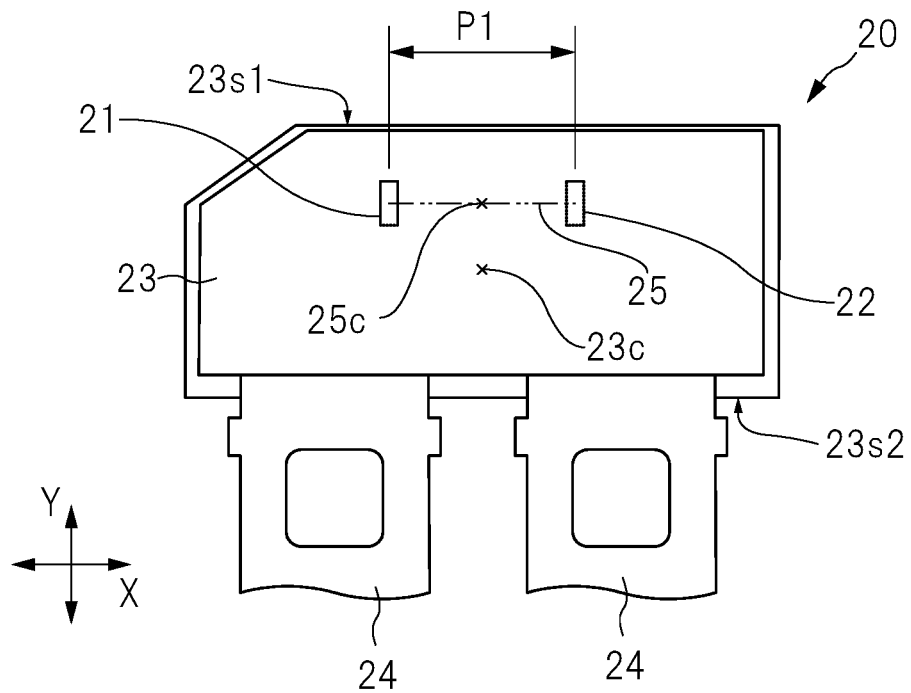
FIG. 5 is an enlarged perspective planar view showing positions of magnetic sensing elements inside the sensor component on an X-Y plane including a Y direction shown in FIG. 1 and an X direction shown in FIG. 2.

First, with reference to FIG. 5, the sensor component 20 according to the present embodiment will be explained. FIG. 5 shows positions of the two magnetic sensing elements 21 and 22 in the planar view (view of the first direction) obtained when the X-Y plane including the X direction and the Y direction is viewed. The magnetic sensing elements 21 and 22 are arranged so as to separate from and adjacent to each other in the X direction. The center-to-center distance P1 between the magnetic sensing elements 21 and 22 is 1.69 mm.

The magnetic sensing elements 21 and 22 are sealed by a sealing body 23. Inside the sealing body 23, the magnetic sensing elements 21 and 22 are electrically connected to lead wires 24. One part of each of the plurality of lead wires 24 is sealed inside the sealing body 23, and the other part extends out of the sealing body 23. A signal depending on the magnetic field that is sensed by the magnetic sensing elements 21 and 22 is output out of the sensor component 20 through the lead wire 24.

The magnetic sensing elements 21 and 22 are arranged at positions that are displaced in the Y direction from center 23c of the sealing body 23 in the planar view obtained when the X-Y plane is viewed. More specifically, in the planar view, the sealing body 23 includes a side 23s1 and a side 23s2 on an opposite side of the side 23s1 in the Y direction. The magnetic sensing elements 21 and 22 are arranged at positions that are closer to the side 23s1 than the side 23s2 in the planar view obtained when the X-Y plane is viewed. Therefore, the center 25c of the line 25 (that is the virtual line shown with the dashed double-dotted line in FIG. 5) connecting the center of the magnetic sensing element 21 and the center of the magnetic sensing element 22 does not overlap the center 23c of the sealing body 23.

Figure 6:
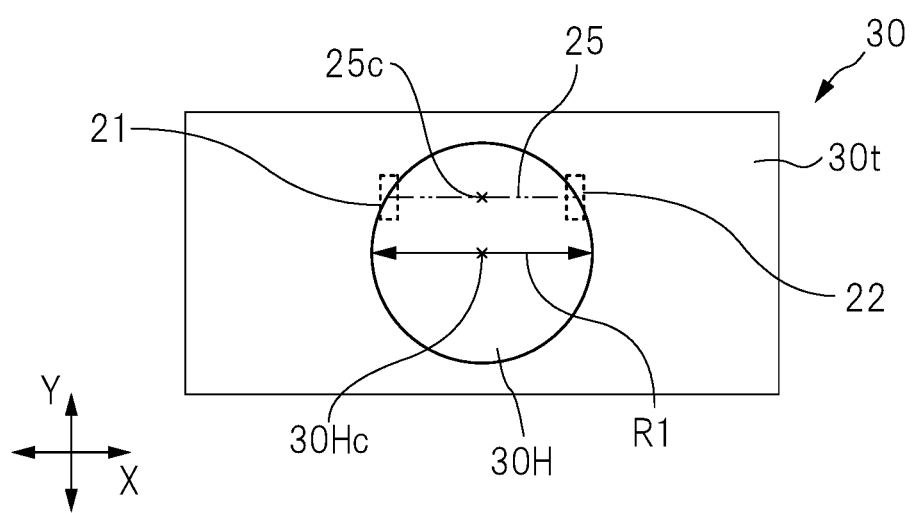
FIG. 6 is a planar view on an X-Y plane of a magnetic plate shown in FIG. 3.

In FIG. 6, each outline of the magnetic sensing elements 21 and 22 is shown with a dotted line in order to show the planar positional relation between the opening 30H and the magnetic sensing elements 21, 22. As shown in FIG. 6, the magnetic plate 30 has a rectangular outer edge shape in the planar view (view of the first direction) obtained when the X-Y plane is viewed. In the planar view, the opening 30H is formed at center of the magnetic plate 30. The opening 30H is arranged at a position overlapping the center 25c of the line 25 (that is the virtual line shown with the dashed double-dotted line in FIG. 5) connecting the center of the magnetic sensing element 21 and the center of the magnetic sensing element 22.

In the present embodiment, a shape of an opening end of the opening 30H is circular. An opening diameter R1 of the opening end is larger than the center-to-center distance P1 (see FIG. 5) between the magnetic sensing elements 21 and 22. For example, the opening diameter R1 is 2 mm.

In the present embodiment, the opening 30H of the magnetic plate 30 is formed at the position overlapping both the magnetic sensing elements 21 and 22. In order to achieve the large air gap G1 (see FIG. 1), the opening 30H preferably overlaps at least either one of the magnetic sensing elements 21 and 22. The opening 30H particularly preferably overlaps both the magnetic sensing elements 21 and 22.

As described above, the magnetic sensing elements 21 and 22 are arranged at the positions that are displaced in the Y direction from the center 23c of the sealing body 23 in the planar view. In the planar view, the magnetic plate 30 is arranged at the position overlapping the sealing body 23 of the sensor component 20. In the planar view, the opening 30H is arranged at the center of the magnetic plate 30. In the present embodiment, the center 23c of the sealing body 23 overlaps the center 30Hc of the opening 30h. Therefore, the center 25c of the line 25 connecting the center of the magnetic sensing element 21 and the center of the magnetic sensing element 22 does not overlap the center 30Hc of the opening 30H. However, from experiment results, it is found that the opening 30H is preferably arranged at the position overlapping the center 25c of the line 25 in order to achieve the large air gap G1.

Figure 7:
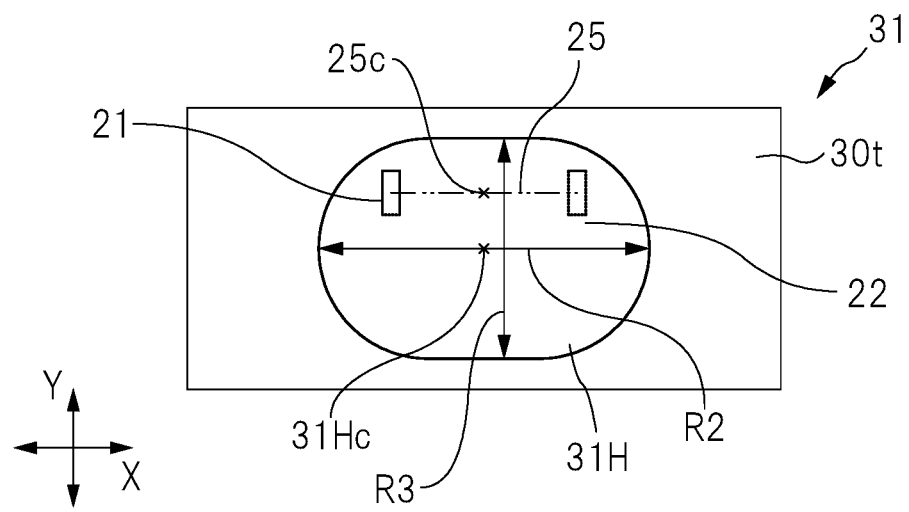
FIG. 7 is a planar view showing a modification example of the magnetic plate shown in FIG. 6.

FIG. 7 is a planar view showing a modification example of the magnetic plate shown in FIG. 6. An opening shape of an opening 31H of a magnetic plate 31 shown in FIG. 7 is different from the opening shape of the opening 30H of the magnetic plate 30 shown in FIG. 6. The opening 31H has a shape made of a pair of parallel straight portions and a pair of arc portions. An opening end of the opening 31H of the magnetic plate 31 shown in FIG. 7 has an opening diameter R2 extending in the X direction and an opening diameter R3 extending in the Y direction that is orthogonal to the X direction. In the example shown in FIG. 7, the opening diameter R2 is 3 mm, and the opening diameter R3 is 2 mm. Therefore, the opening diameter R3 is smaller than the opening diameter R2 but larger than the center-to-center distance P1 between the magnetic sensing elements 21 and 22 (see FIG. 5).

Figure 9:
FIG. 9 is an explanatory diagram showing examination results of influences of presence of an opening formed in the magnetic plate and a size of the opening on the maximum air-gap value.

Next, in an experiment shown in FIG. 9, the influences of the presence of the opening formed in the magnetic plate and the size of the opening on the maximum value of the air gap G1 (see FIG. 1) have been examined. FIG. 9 shows a column chart taking a vertical axis as a measurement result of the maximum air-gap value of each working example. The achievement of the large air gap is one of purposes of the present application, and therefore, the large maximum air-gap value is a preferable result.

Figure 8:
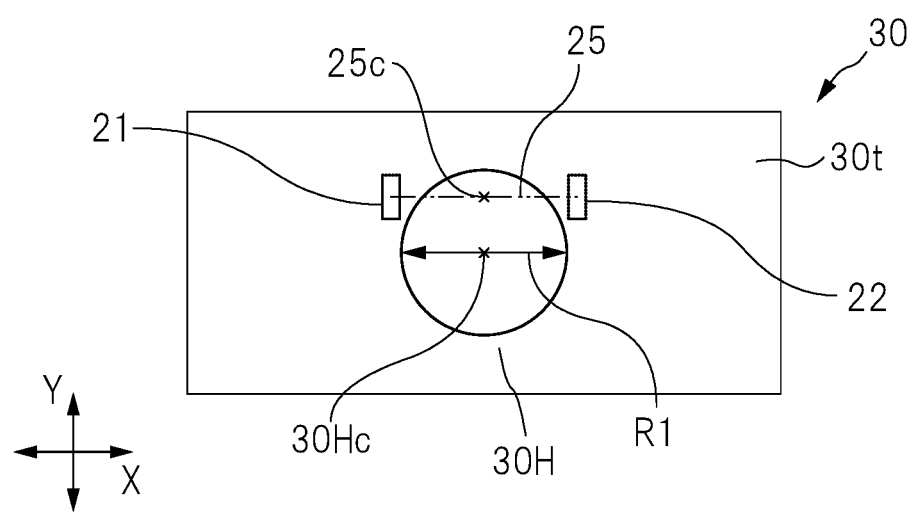
FIG. 8 is a planar view showing another modification example of the magnetic plate shown in FIG. 6.

FIG. 9 shows the measurement results of a comparative example E0 and working examples E1 to E3. The comparative example E0 has provided the measurement result in a case of usage of a magnetic plate without the opening as seen in the magnetic plate 30C of the rotation speed sensor RSS2 shown in FIG. 4. The working example E1 has provided the measurement result in a case in which the opening diameter R1 of the opening 30H shown in FIG. 8 is 1.5 mm. The working example E2 has provided the measurement result in a case in which the opening diameter R1 of the opening 30H shown in FIG. 6 is 2 mm. The working example E3 has provided the measurement result in a case in which the opening diameter R2 of the opening 30H shown in FIG. 7 is 3 mm while the opening diameter R3 thereof is 2 mm.

In the working examples E1 to E3, the center 30Hc of the opening 30H shown in FIG. 6 (or the center 31Hc of the opening 31H shown in FIG. 7) is arranged at the position overlapping the center 23c of the sealing body 23 (see FIG. 5).

In comparison between the comparative example EU and each working example of the working examples E1 to E3 shown in FIG. 9, it is found that the maximum air-gap distance becomes large when the opening 30H or 31H is formed in the magnetic plate 30 or 31. When the opening 30H (or 31H shown in FIG. 7) is formed in vicinity of the magnetic sensing elements 21 and 22 shown in FIG. 3, the magnetic flux density of the magnetic field penetrating the magnetic sensing elements 21 and 22 increases.

In comparison between the working example E1 and the working example E2, the air gap of the working example E1 is 2.2 mm while the air gap of the working example E2 is 3.5 mm. In the case of the working example E1, the opening diameter R1 is 1.5 mm as shown in FIG. 8, and therefore, the opening 30H does not overlap the magnetic sensing elements 21 and 22. In the case of the working example E3 using the magnetic plate 31 shown in FIG. 7, the air gap is 2.45 mm that is larger than the air gap of the working example E1. From this result, it is found that the opening 30H preferably overlaps the magnetic sensing elements 21 and 22.

In comparison between the working example E2 and the working example E3, the maximum air-gap value of the working example E2 is 1.4 or more times larger than that of the working example E3. It is considerable that this is because the magnetic flux line in the case of the working example E3 is difficult to concentrate on the region around the magnetic sensing elements 21 and 22 since the opening 31H is large. From this result, as shown in FIG. 6, it is found that the opening 30h having a size allowing the opening end of the opening 30H to overlap the magnetic sensing elements 21 and 22 is particularly preferable.

Figure 10:
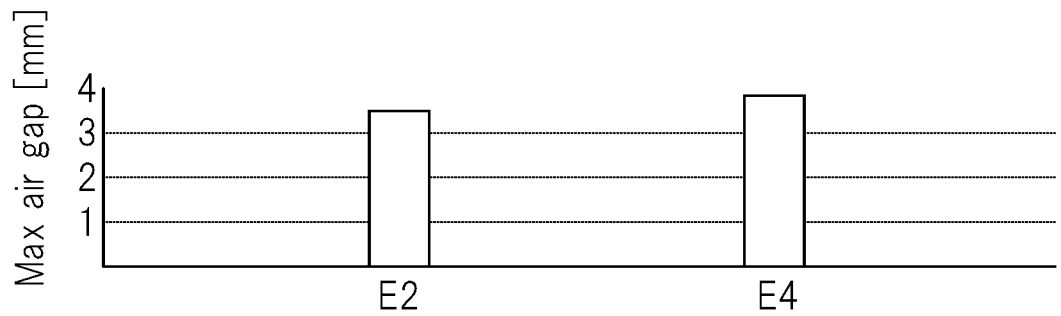
FIG. 10 is an explanatory diagram showing examination results of influences of planar positional relation between the opening and the magnetic sensing element on the maximum air-gap value.

Next, in an experiment shown in FIG. 10, the position of the magnetic plate 30 shown in FIG. 6 has been displaced in the Y direction, and the influence of the planar positional relation between the opening 30H and the magnetic sensing elements 21, 22 on the maximum air-gap value has been studied. As similar to FIG. 9, FIG. 10 shows a column chart taking a vertical axis as a measurement result of the maximum air-gap value of each working example.

Figure 11:
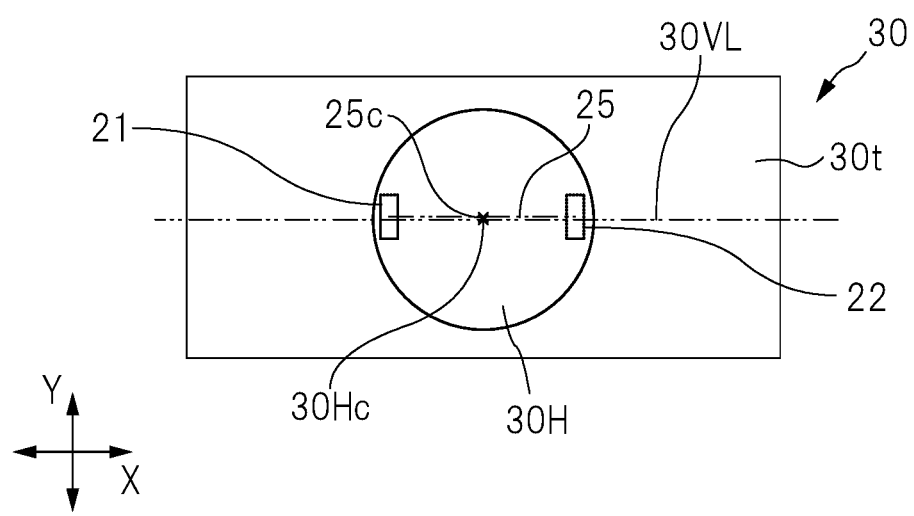
FIG. 11 is a planar view showing a state in which the magnetic plate shown in FIG. 6 is displaced in the Y direction.

FIG. 10 shows the measurement results of the working example E2 and the working example E4. The working example E4 has provided the measurement result in a state in which the magnetic plate 30 is displaced in the Y direction to a position at which the center 30Hc of the opening 30H and the center 25c of the line 25 almost overlaps each other as shown in FIG. 11. More specifically, the magnetic plate 30 shown in FIG. 6 is displaced in the Y direction by 0.6 mm. In this case, the magnet 10 and the sensor component 20 have not been displaced. The opening diameter R1 of the opening 30H is 2 mm as similar to FIG. 6.

A layout shown in FIG. 11 is different from a layout shown in FIG. 6 because each of the magnetic sensing elements 21 and 22 overlaps a virtual line 30VL travelling the center 30Hc of the opening 30H. The maximum air-gap value of the working example E4 shown in FIG. 10 is 3.85 mm that is further larger than the maximum air-gap value of the working example E2.

Note that the maximum air-gap value of the working example E2 is smaller than the maximum air-gap value of the working example E4 but larger than the maximum air-gap values of the working example E1 and the working example E3 shown in FIG. 9. In comparison with the comparative example E0 using the magnetic plate 30C shown in FIG. 4, this case is effective for the achievement of the large air gap when a displacement amount of the opening 30H is within a range in which the opening overlaps the magnetic sensing elements 21 and 22 as shown in FIG. 6.

Figure 12:
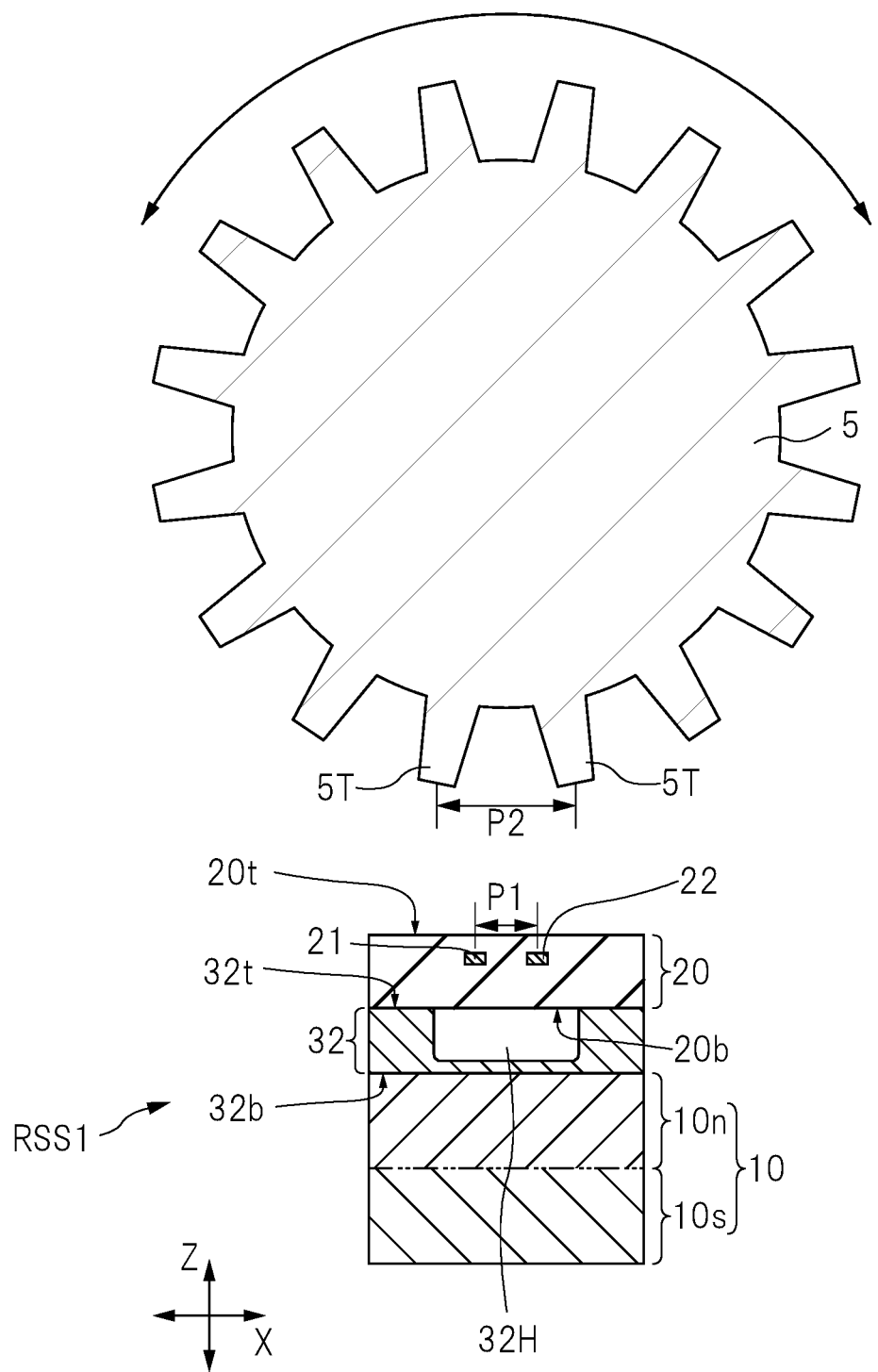
FIG. 12 is a cross-sectional view of a principal part showing a modification example of the magnetic plate shown in FIG. 2.

While the opening 30H (or 31H) that is formed in the magnetic plate 30 in the present embodiment is the through hole that penetrates the magnetic plate 30 from one of the top surface 30t and the bottom surface 30b of the magnetic plate 30 to the other, the opening may be an opening that does not penetrate it. In other words, in a modification example shown in FIG. 12, an opening 32H of a magnetic plate 32 is formed in a region closer to a top surface 32t of the magnetic plate 32, and does not penetrate so as to extend to the bottom surface 32b. Even this case is effective for the achievement of the large air gap in comparison with the example shown in FIG. 4. However, in the viewpoint of the maximization of the air gap, the opening preferably penetrates the magnetic plate 30 from one of the top surface 30t and the bottom surface 30b of the magnetic plate 30 to the other as seen in the opening 30 shown in FIG. 2.

The present invention is not limited to the foregoing embodiments and working examples, and various modifications can be made within the scope of the present invention. For example, some of the plurality of modification examples as described above may be applied in combination.

What is claimed is:

1. A rotation speed sensor comprising:
    a sensor component having a first surface, a second surface on an opposite side of the first surface, a first magnetic sensing element arranged between the first surface and the second surface, and a second magnetic sensing element arranged between the first surface and the second surface so as to separate from the first magnetic sensing element;
    a magnet arranged in a region closer to the second surface of the sensor component than the first surface of the sensor component; and
    a magnetic plate arranged between the second surface of the sensor component and the magnet and made of a magnetic material different from the magnet,
    wherein the magnetic plate includes an opening formed in a first direction that is a direction in which the sensor component, the magnetic plate and the magnet are arranged,
    the opening is a through hole that penetrates the magnetic plate in the first direction,
    one end of the opening faces the sensor component, and the other end of the opening faces the magnet.

2. The rotation speed sensor according to claim 1,
    wherein the opening is formed at a position overlapping center of a line connecting center of the first magnetic sensing element and center of the second magnetic sensing element in view of the first direction.

3. The rotation speed sensor according to claim 1,
    wherein the opening overlaps the first magnetic sensing element or the second magnetic sensing element in view of the first direction.

4. The rotation speed sensor according to claim 1,
    wherein the opening overlaps both the first magnetic sensing element and the second magnetic sensing element in view of the first direction.

5. The rotation speed sensor according to claim 4,
    wherein an opening end of the opening overlaps both the first magnetic sensing element and the second magnetic sensing element in view of the first direction.

6. The rotation speed sensor according to claim 1,
    wherein a shape of the opening end of the opening is circular, and
    an opening diameter of the opening end of the opening is larger than a center-to-center distance between the first magnetic sensing element and the second magnetic sensing element.

7. The rotation speed sensor according to claim 1,
    wherein the first magnetic sensing element and the second magnetic sensing element are arranged along a second direction that is orthogonal to the first direction, an opening end of the opening includes a first opening diameter extending along the second direction and a second opening diameter extending along a third direction that is orthogonal to the first direction and the second direction,
the second opening diameter is smaller than the first opening diameter but larger than a center-to-center distance between the first magnetic sensing element and the second magnetic sensing element.

8. The rotation speed sensor according to claim 1, wherein a virtual line connecting center of the first magnetic sensing element and center of the second magnetic sensing element overlaps center of the opening in view of the first direction.

* * * * *